US008627982B2

(12) United States Patent
Selina

(10) Patent No.: US 8,627,982 B2
(45) Date of Patent: Jan. 14, 2014

(54) THERMAL PROTECTOR SLEEVE FOR HOT DRINK CUP

(75) Inventor: John R. Selina, Brighton, MI (US)

(73) Assignee: Letica Corporation, Rochester, MI (US)

( * ) Notice: Subject to any disclaimer, the term of this patent is extended or adjusted under 35 U.S.C. 154(b) by 94 days.

(21) Appl. No.: 12/858,743

(22) Filed: Aug. 18, 2010

(65) Prior Publication Data

US 2012/0043243 A1 Feb. 23, 2012

(51) Int. Cl.
*B65D 81/38* (2006.01)

(52) U.S. Cl.
USPC .......................... 220/738; 220/739; 220/903

(58) Field of Classification Search
USPC ............ 206/459.5, 459.1; 229/403, 400, 4.5; 220/903, 738, 739, 737, 740; D7/624.2
See application file for complete search history.

(56) References Cited

U.S. PATENT DOCUMENTS

| | | | |
|---|---|---|---|
| D243,910 S * | 4/1977 | Herpel | D7/523 |
| 4,181,765 A | 1/1980 | Harmony | |
| 4,989,418 A | 2/1991 | Hewlett | |
| 5,103,979 A * | 4/1992 | Hustad | 206/459.1 |
| 5,205,473 A * | 4/1993 | Coffin, Sr. | 229/403 |
| 5,226,585 A * | 7/1993 | Varano | 229/400 |
| 5,425,497 A | 6/1995 | Sorensen | |
| 5,820,016 A * | 10/1998 | Stropkay | 229/403 |
| 5,826,786 A | 10/1998 | Dickert | |
| D401,122 S | 11/1998 | Rench et al. | |
| 5,857,615 A * | 1/1999 | Rose | 229/403 |
| D429,447 S | 8/2000 | Prag | |
| 6,422,456 B1 * | 7/2002 | Sadlier | 229/403 |
| 6,814,253 B2 * | 11/2004 | Wong | 220/739 |
| D515,365 S | 2/2006 | Cooper | |
| 7,458,504 B2 * | 12/2008 | Robertson et al. | 229/403 |
| D591,557 S * | 5/2009 | Bodum | D7/396.2 |
| D595,096 S | 6/2009 | Slay | |
| D597,382 S | 8/2009 | Bognar | |
| D597,795 S | 8/2009 | Ford | |
| D623,474 S * | 9/2010 | Carlson et al. | D7/510 |
| D623,476 S * | 9/2010 | Carlson et al. | D7/510 |
| D634,159 S * | 3/2011 | Bodum | D7/509 |
| 8,006,861 B2 * | 8/2011 | Kim | 220/737 |
| D644,879 S * | 9/2011 | Hadley | D7/510 |
| D645,305 S * | 9/2011 | Hadley | D7/396.2 |
| D645,699 S * | 9/2011 | Hadley | D7/396.2 |
| 8,025,210 B2 * | 9/2011 | Johnson et al. | 229/403 |
| 2003/0150148 A1 * | 8/2003 | Spear et al. | 40/638 |
| 2004/0128877 A1 * | 7/2004 | Luedde | 40/306 |
| 2004/0173625 A1 | 9/2004 | Jones | |
| 2006/0000882 A1 * | 1/2006 | Darzinskas | 229/403 |
| 2006/0144915 A1 * | 7/2006 | Sadlier | 229/403 |
| 2007/0125787 A1 | 6/2007 | Oathout et al. | |
| 2007/0125791 A1 | 6/2007 | Donnelly et al. | |
| 2008/0041864 A1 * | 2/2008 | Wong | 220/738 |
| 2008/0078824 A1 * | 4/2008 | Spriegel et al. | 229/403 |
| 2009/0057257 A1 * | 3/2009 | Marcus et al. | 215/11.6 |
| 2010/0072268 A1 * | 3/2010 | Johnson et al. | 229/403 |
| 2010/0200647 A1 * | 8/2010 | Tedford et al. | 229/403 |

\* cited by examiner

*Primary Examiner* — Steven A. Reynolds
(74) *Attorney, Agent, or Firm* — Young Basile Hanlon & MacFarlane PC

(57) ABSTRACT

A thermal protection sleeve for use in combination with hot drink cups comprising a flat embossed sleeve or band of compressed paper embossed with straight-sided geometric figures over much of the surface thereof. However, overlapping end surface areas are not embossed but are glued together with a suitable biodegradable adhesive. In addition, an unembossed logo blank is provided substantially in the center of the band.

4 Claims, 3 Drawing Sheets

THERMAL PROTECTOR SLEEVE FOR HOT DRINK CUP

FIELD OF THE INVENTION

This invention relates to thermal protection sleeves for use in combination with hot drink cups.

BACKGROUND OF THE INVENTION

The use of paper cups to dispense hot drinks such as coffee has given rise to the use of an accessory device in the form of a sleeve of material such as plastic or paper that can be slipped around the gripping area of the cup to protect the end user from the transfer of heat from the contents of the cup through to the end user's hand.

Such protection sleeves are often made of a single ply of heavy paper, embossed to exhibit a surface pattern which adds to the insulative quality of the sleeve by creating areas of air space between the sleeve and the cup. Two examples of such sleeves are illustrated in U.S. Pat. No. 5,425,497 to Sorenson and U.S. Pat. No. 5,826,786 to Dicker.

SUMMARY OF THE INVENTION

The present invention provides an improved single-ply insulative sleeve for use in combination with hot drink cups comprising a band of suitable organic material such as recycled paper having top and bottom edges and overlapping opposite end surface areas with an adhesive bond therebetween. In accordance with the invention, the sleeve has embossed or otherwise formed therein a regular pattern of geometric figures over at least the majority of the surface thereof to form closely spaced elevations and depressions from the nominal plane of the band.

In a preferred embodiment hereinafter described in detail, the top and bottom edges are arcuate so as to produce a slightly tapered sleeve to fit a tapered cup. The band is preferably made of compressed recycled paper which is readily embossed and further comprises one or more raised logo blanks between the end surface areas. This logo band or bands are readily printed or otherwise provided with a logo and/or trademark or other indicia rendering the sleeve attractive and/or valuable for purposes of product source recognition.

In commercial form, the sleeve is folded flat along opposite fold lines and shipped in multiples to, for example, convenience stores and fast food franchises where they are distributed to end users. The embossing does not extend into the glue seam overlap area or the logo blank.

Further in accordance with the present invention, the pattern of geometric figures in the sleeve is aggressively embossed, preferably such as to produce straight-sided polyhedrons or small areas made up of short parallel grooves and raised lines to give the sleeve a distinctive tactile feel and also to increase the thermal insulative effect. The material of construction is paperboard between about 0.017 and 0.020 inches in thickness and a weight of about 69 to 72 pounds per 1,000 square feet. The displacement of the positive and negative embossed areas is approximately equal to the paperboard thickness; i.e., on the order of 0.020 inches. Therefore, the total thickness of the sleeve is on the order of 0.06 inches.

BRIEF DESCRIPTION OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENT

Figure 1:
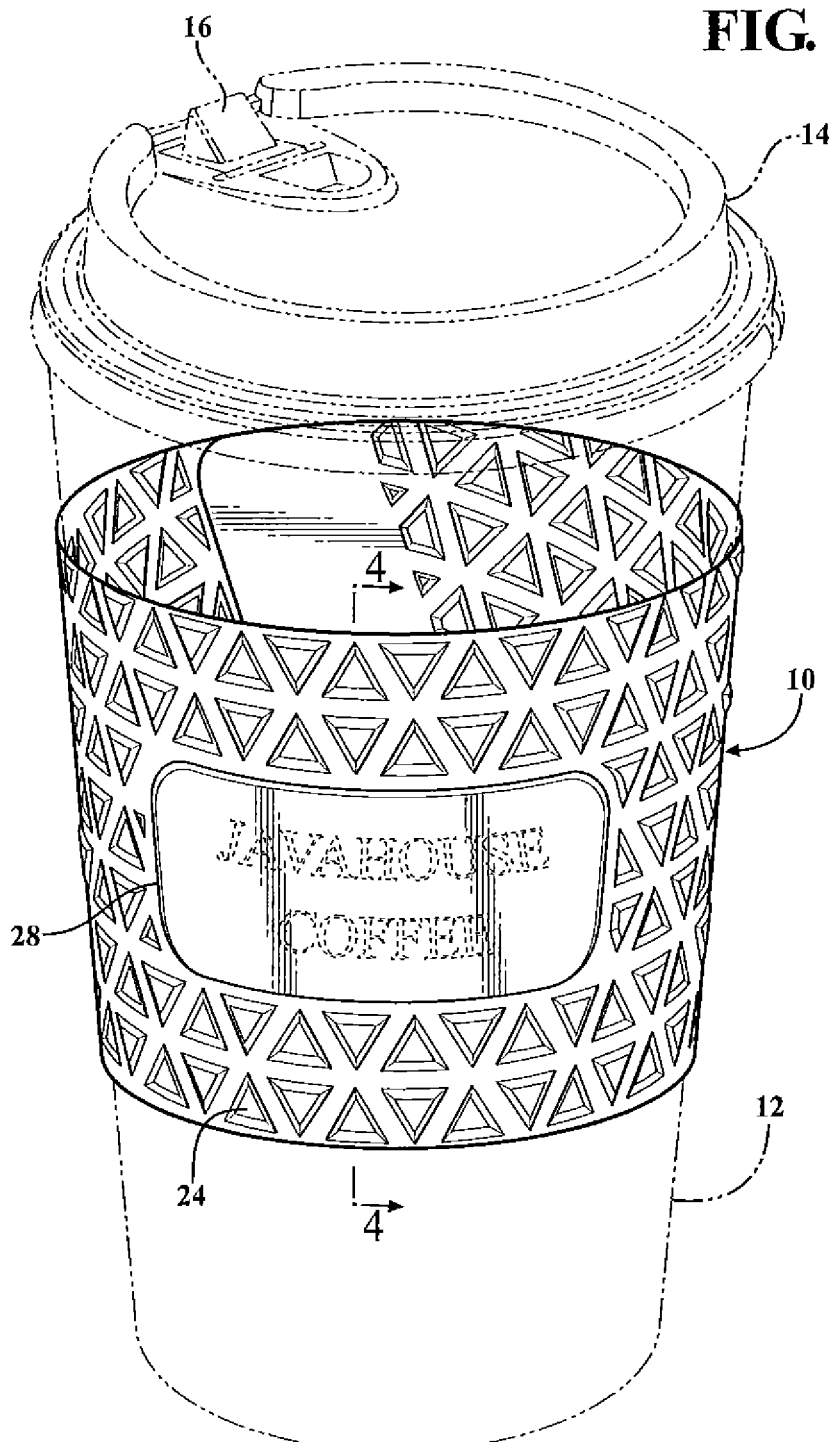
FIG. 1 is a perspective view of a sleeve configured in accordance with the invention and shown in cooperative relationship with a hot drink cup shown in phantom.
Figures 2, 5:
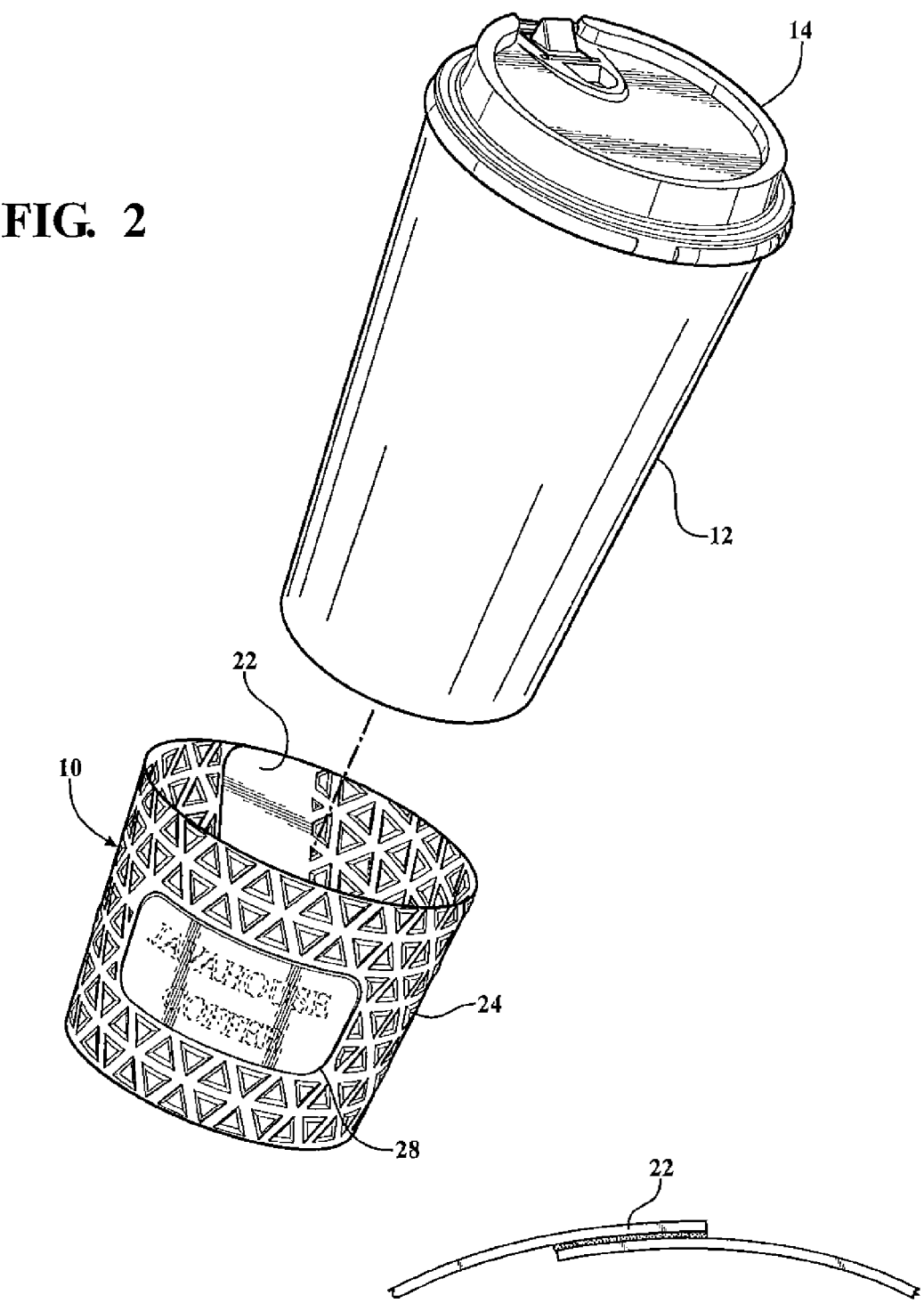
FIG. 2 is a exploded view of the sleeve of FIG. 1 and a hot drink cup.
FIG. 5 is a cross-section of the overlapped seam.
Figure 3:
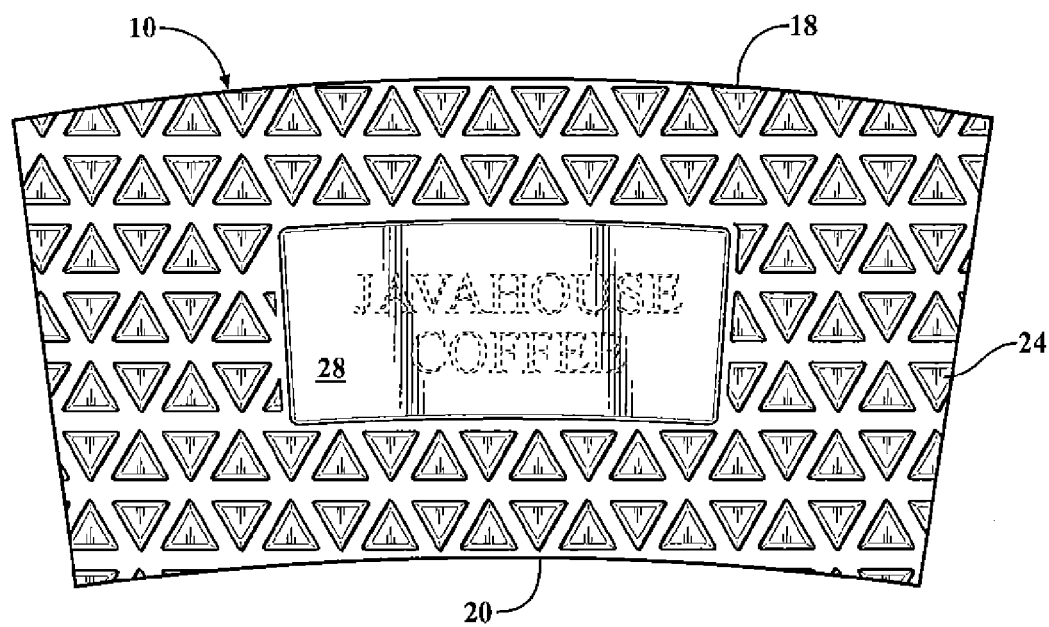
FIG. 3 is a plan view of the sleeve of FIG. 1.

Referring to the figures, there is shown a thermal protective sleeve 10 made of an organic material, preferably compressed paper or other similar fibrous material. The paper may be partly or wholly recycled or completely virgin. The sleeve 10 is shown in FIGS. 1 and 2 in combination with a tapered paper hot drink cup 12 having a thermoformed plastic lid 14 with a drink-through feature 16. The dimensions of the sleeve 10 are such as to allow it to slip over the bottom of the cup 12 and be lifted up along the length of the cup until it snugly conforms to a portion of the cup sidewall area, just under the thermoformed plastic lid 14 but spaced therefrom by non-critical dimension as shown in FIG. 1.

The sleeve 10 has arcuate top and bottom edges 18 and 20, respectively and bias-cut overlapping end surface areas at 22 which are adhesively bonded together by a suitable glue, preferably one which is biodegradable for environmental protection purposes.

Figure 4:
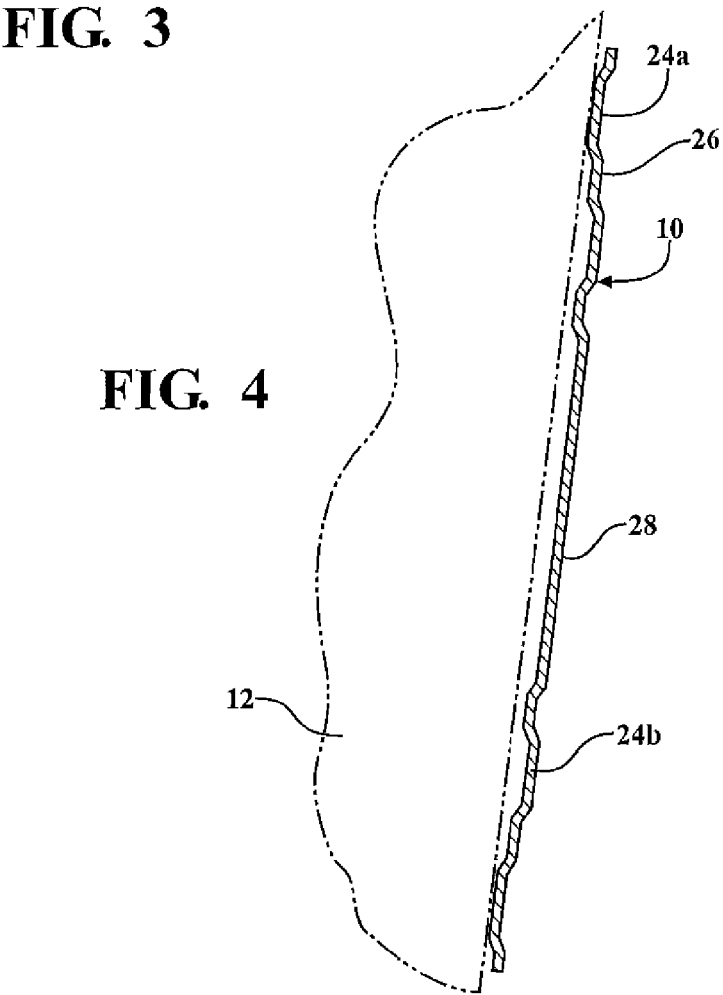
FIG. 4 is a cross-sectional view of the sleeve of FIG. 1.

The surface of the sleeve 10 is embossed with a pattern of geometric figures 24, in this instance triangular figures, but any of a variety of other figures including polyhedrons and composite figures made up of closely spaced straight embossed positive and negative grooves can be used as shown, for example, in my co-pending application for design patent, Ser. No. 29/368,103. The figures 24 are approximately 50% depressed or "negative" to form low-planar areas 24a and approximately 50% raised or "positive" to form planar areas 24b as illustrated in FIG. 4. Between the planes 24a and 24b is a mid-plane level 26 which is occupied by the unembossed areas, including the overlap areas 22.

Approximately centrally between the top and bottom edges 18, 20 and the opposite ends of the sleeve is a raised embossed logo blank 28 which can be printed with various indicia, trademarks, corporate logos, decorative materials and other indicia as desired. The geometric figures 24 are not embossed into the logo blank 28 nor are they embossed into the overlap areas 22 at the opposite ends of the sleeve. This creates a flat area for the glue bond at 22 and also facilitates printing on the raised logo bond 28. The plane of the logo bond 28 is level with the plane of the raised embossed figures 24b, as shown in FIG. 4. Multiple spaced apart logo blanks can also be used.

In the manufacturing process, the bands or sleeves 10 are formed in multiples in a wide sheet of material which are thereafter die cut into individual bands or sleeves and glued together to form the overlap bond area 22. Printing is typically carried out before the glue bond is formed, but the designer has options in this regard. The sleeves 10 are then folded flat and packaged in multiples for shipment to convenience stores, fast food restaurants and other dissemination points where they are made available to the end users who purchase hot drinks.

What is claimed is:

1. A disposable, paperboard sleeve for use in combination with a hot drink cup to protect a user's hand from heat comprising:

a tapered, cylindrical body of compressed paperboard having upper and lower circular parallel edges and being of such size and shape as to fit, in use, over and snugly against part of the outside surface of a tapered paperboard hot drink cup;

said body having an embossed raised unitary, printable logo area having defined contiguous borders substantially centrally thereof;

said body further having a pattern of regularly spaced rows and columns of spaced-apart triangular figures that are narrowly spaced apart by a continuous intermediate level area; wherein the figures in each row and in each column are alternatingly upwardly and downwardly pointed and are alternatingly, exclusively and completely embossed to a raised level and exclusively and completely debossed to a depressed level relative to said intermediate level area between and around said figures such that no two adjacent figures in the same row or in the same column have the same pointing orientation or are on the same level relative to the intermediate level; the populations of raised and depressed triangular figures being approximately the same; the embossed raised figures being on the same level of said logo area; said logo area having an overall area which is larger than the aggregate area of a substantial plurality of said triangular figures and being located fully between said edges; and said body having overlapped, unembossed adhesively-bonded edge areas to form said body into a tapered cylindrical sleeve.

2. A sleeve as defined in claim 1 wherein the triangular figures are all of substantially the same size.

3. The sleeve of claim 1 wherein the paperboard weight is on the order of 69-72 lbs. per thousand square feet, the depth of the embossing and debossing is on the order of 0.020 inches and the total thickness of the embossed sleeve is on the order of 0.06 inches.

4. A disposable paperboard sleeve for use in combination with a hot drink cup to protect a user's hand from heat comprising:

a tapered, cylindrical body of paperboard having upper and lower parallel edges and being of such size and shape as to fit over and snugly against part of the outside surface of a tapered hot drink cup;

said body having a pattern of regularly spaced rows and columns of spaced-apart triangular figures that are narrowly spaced apart by a continuous intermediate level background area; and wherein the figures in a row and column are of equal size and are alternatingly completely embossed to a raised level or completely debossed to a depressed level relative to the level of said intermediate level background area between and around said figures;

said triangular figures in each vertical column and each horizontal row being alternately upwardly and downwardly pointing; the upwardly pointing figures in each vertical column being adjacent downwardly pointing figures in each next adjacent column such that no two adjacent figures in any row or column share the same orientation or level.

* * * * *